United States Patent [19]
Takamura et al.

[11] Patent Number: 5,477,296
[45] Date of Patent: Dec. 19, 1995

[54] CAMERA WITH A VARIABLE FOCUS LENS DEVICE

[76] Inventors: Masashi Takamura, c/o Fuji Photo Film Co., Ltd. 26-30 Nishiazabu 2-chome, Minato-ku, Tokyo; Syunji Nishimura, c/o Fuji Photo Optical Co., Ltd., 324 Uetake-machi 1-chome, Ohmiya-shi, Saitama-ken; Yoji Naka, c/o Fuji Photo Film Co., Ltd., 13-45 Sensui 3-chome, Asaka-shi, Saitama-ken, all of Japan

[21] Appl. No.: 220,225

[22] Filed: Mar. 30, 1994

[30] Foreign Application Priority Data

Mar. 30, 1993 [JP] Japan .................................. 5-095530
Mar. 30, 1993 [JP] Japan .................................. 5-095531
Mar. 30, 1993 [JP] Japan .................................. 5-095532

[51] Int. Cl.⁶ ...................................................... G03B 1/18
[52] U.S. Cl. ...................................................... 354/195.1
[58] Field of Search ............................. 354/195.1, 195.12

[56] References Cited

U.S. PATENT DOCUMENTS

5,035,493  7/1991  Tanaka .
5,041,855  8/1991  Takezawa et al. .

*Primary Examiner*—Monroe H. Hayes
*Attorney, Agent, or Firm*—Young & Thompson

[57] ABSTRACT

A camera with a variable focus lens device, in which a lens position detecting device detects the focal length of the photographing lens from the amount of movement of a movable member that is capable of being rectilinearly advanced and retracted along the optical axis of the photographing lens, in order to provide an autofocusing function to accurately focus upon an object. Thus, the focal length can be detected in a simplified manner, and the influence of errors during assembly of the components of a photographing lens driving system can be minimized. A flare preventing mask effectively prevents flare occurrence in correspondence to variations in the position of the photographing lens. The lens retaining structure simplifies the assembly of the front lens group into a movable lens mount, and reduces the size and weight of the camera. A position sensor is coupled to the movable member which moves while maintaining a predetermined relation with the movement of the photographing lens, and the position of the photographing lens is detected from the amount of movement of the movable member. A key member prevents rotation of the movable lens mount and so allows the movable lens mount to be advanced or retracted a lesser distance than the movable lens mount. The flare preventing mask is mounted on the key member. A rear focusing type autofocusing mechanism is provided by inserting a holder retaining the front lens group into the movable lens mount from the front end of the lens mount.

19 Claims, 5 Drawing Sheets

(Prior Art)

FIG. 5

CAMERA WITH A VARIABLE FOCUS LENS DEVICE

FIELD OF THE INVENTION

The present invention relates to cameras which have a variable focus lens device such as a zoom lens device and an autofocusing device. The invention more particularly relates to a lens position detecting device for detecting the position of a _ zoomed photographing lens in order to detect the focal length of the lens, and a structure for supporting a flare preventing mask for preventing, through the zooming operation, undesirable flare from being caused by light entering the photographing lens, as well as a structure for retaining a front lens group constituting the compound photographing lens.

PRIOR ART

In recent years, cameras have been popularly used in many applications which are fitted with a variable focus lens device that is designed to enable any photographer to readily take good photographs without the need to interchange the component lenses. Typical examples of such variable focus lens devices are so-called focus switching devices which allow the focal length of the photographing lens to be switched between a long focal length (telephoto position) and a short focal length (wide-angle position), and a zoom lens device which is capable of continuously changing the focal length of the photographing lens. These cameras fitted with variable focus lens devices also have structure for moving the component lenses along the optical axis in order to properly change the focal length as required. Furthermore, many of the above-mentioned types of cameras can automatically focus on an object to be photographed, such as by the photographer depressing the release button halfway while pointing the camera at the object. This function is known as an autofocusing function and services greatly to facilitate the photographer's focusing operation.

In variable focus lens devices, a front lens group and a rear lens group, constituting the compound photographing lens, are retained in a movable lens mount. The variable focus lens device can change the focal length while maintaining a predetermined optical relation between the front and rear lens groups, by advancing or retracting the movable lens mount in relation to a fixed lens mount along the optical axis and also advancing or retracting the rear lens group with respect to the movable lens mount along the optical axis in accordance with the advance or retraction of the movable lens mount. The autofocusing device is designed to move, upon release of the shutter and prior to an exposure operation, a focusing lens from a reference position to an in-focus position on the basis of the distance to an object that is detected by a distance measuring circuit.

In such cameras with variable focus lens devices having an autofocusing function, the photographing lens must be driven to an in-focus position, and thus the current focal length of the photographing lens must be accurately detected by a suitable detecting means. However, because the photographing lens is retained by and within a shutter unit or the like, it is difficult, if not impossible, directly to detect the position of the photographing lens with accuracy. Furthermore, because the amount of movement of the movable lens mount retaining the photographing lens is relatively large and yet the movable lens mount is accommodated within a driving lens mount, mounting the detection means on the movable lens mount is extremely difficult and makes the camera structure very complicated. Hence, the position of the photographing lens has hitherto been indirectly detected by detecting the position of a given component associated with the driving of the movable lens mount.

A conventional lens position detecting device of the above-described type is known which detects the position of the photographing lens by detecting the amount of angular movement of the driving lens mount or the rotational speed of a driving motor by the use of a photo interrupter, or by detecting the rotational angle of a particular gear used for driving the driving lens mount by the use of an encoder mounted alongside the gear.

Furthermore, in the above-described type cameras with a variable focus lens device, since the component lenses are moved along the optical axis in order to change the focal length, the amount of flare may differ substantially depending on the current position of the lenses along the optical axis. To effectively prevent the occurrence of flare in both the telephoto position and the wide-angle position, a flare preventing mask is provided between the photographing lens and the film in such a manner that the mask is moved along the optical axis together with the component lenses.

Figure 5:
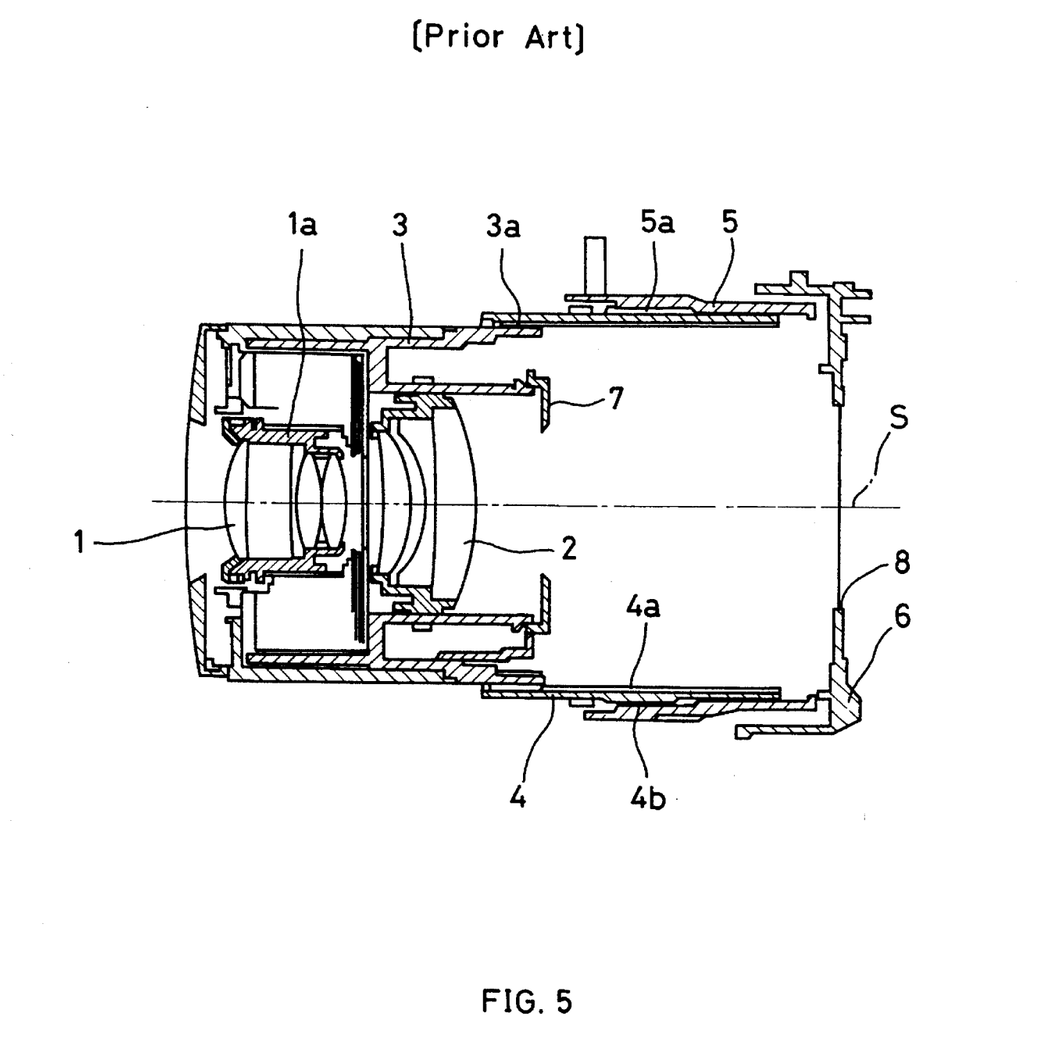
FIG. 5 is a cross-sectional view similar to FIG. 2, illustrating a conventional camera with a variable focus lens device.

FIG. 5 illustrates a prior art example of a structure for supporting a conventional flare preventing mask of the above-described type that is employed in a camera with a zoom lens device. In this zoom lens device, a helicoid 3a is formed in the outer peripheral surface of a movable lens mount 3 retaining a front lens group 1 and a rear lens group 2. The movable lens mount 3 is accommodated in an intermediate lens mount 4 which has helicoids 4a and 4b in the inner and outer peripheral surfaces, respectively, thereof. The intermediate lens mount 4 is in turn accommodated in a fixed lens mount 5 which has a helicoid 5a in the inner peripheral surface thereof. The fixed lens mount 5 is fixed to a camera body 6. When the intermediate lens mount 4 is rotated with respect to the fixed lens mount 5, the intermediate lens mount 4 is caused to move along the optical axis S due to the engagement of the helicoid 4b with the helicoid 5a. Furthermore, since the movable lens mount 3 is accommodated in the intermediate lens mount 4 by the engagement between the helicoids 4a and 3a and the movable lens mount 3 is prevented from rotating by being guided by a guide rod (not shown) parallel to the optical axis S, the movable lens mount 3 is caused to move along the optical axis S as the intermediate lens mount 4 rotates. The front lens group 1 is retained at a predetermined position in the movable lens mount 3, while the rear lens group 2 is movable along the optical axis S by an amount different from the amount of movement of the movable lens mount 3 via a suitable means such as a cam mechanism. Because of this, as the movable lens mount 3 is moved along the optical axis S, the front and rear lens groups 1 and 2 move together while maintaining a predetermined optical relation therebetween, thereby to change the focal length.

A flare preventing mask 7 is mounted on the rear end of the movable lens mount 3 and thus movable along the optical axis S as the movable lens mount 3 moves. FIG. 5 illustrates the state wherein the photographing lens has advanced to the telephoto position. When the photographing lens is retracted to the wide-angle position, the flare preventing mask 7 will be located near an aperture 8. Thus, when the flare preventing mask 7 is in the telephoto position, light which has passed through the outer peripheral edge portion of the photographing lens is intercepted by the flare preventing mask 7, while light which has passed through a non-edge portion of the photographing lens, i.e., a portion in and around the central area of the lens, reaches the film without being intercepted. When, on the other hand, the flare preventing mask 7 is in the wide-angle position, light which has passed through the central portion of the photographing lens reaches the film without being intercepted. In other words, flare can be prevented in correspondence with the variation in the focal length of the photographing lens.

Furthermore, with conventional autofocusing devices, the front lens group 1 is used as the focusing lens; that is, upon release of the shutter, the lens group 1 is driven to an in-focus position on the basis of the measured distance to an object. To this end, the front lens group 1 is retained by and in a shutter unit 1a having a front lens group driving mechanism, and the shutter unit 1a is incorporated in the movable lens mount 3.

However, the above-described conventional lens position detecting device detects only the rotational angle of a rotatable member and does not directly detect the amount of movement of a member which moves linearly along the optical axis. Thus, in order to detect the position of the photographing lens, complicated calculations are required for converting the detected rotational angle value into a linear movement value, and also the calculations are very susceptible to errors caused during assembly of the components.

OBJECTS OF THE INVENTION

Therefore, it is a primary object of the present invention to provide a camera with a variable focus lens device which has a lens position detecting device that is designed to detect the position of a photographing lens according to the position of a member linearly movable along the optical axis thereby to simplify calculations for detecting the lens position and which is not susceptible to assembly errors.

Furthermore, since the conventional flare preventing mask 7 is mounted on the movable lens mount 3, its flare preventing capability may sometimes be insufficient. When the photographing lens is located in the telephoto position as shown in FIG. 5, the movable lens mount 3 is at its forwardmost position, and thus the distance between the flare preventing mask 7 mounted on the rear end portion of the movable lens mount 3 and the aperture 8 is very large, so that the bundle of light rays passing through the photographing lens is widened. If the flare preventing mask 7 is disposed at a position closer to the aperture 8 than in FIG. 5, only light passing through the central portion of the photographing lens reaches the film unintercepted, so that flare can be prevented more effectively. In other words, the less the distance from the aperture 8 to the distal end portion of the mask 7, the more effectively flare can be prevented. In such a case wherein the flare preventing mask 7 is very close to the aperture 8, the flare preventing mask functions sufficiently when the photographing lens is in the wide-angle position, but the mask 7 could excessively intercept the light incident on the film surface when the photographing lens is in the telephoto position.

Therefore, it is a second object of the present invention to provide a camera with a variable focus lens device having a flare preventing mask which is capable of reliably and appropriately preventing flare regardless of the variation in the focal length of the photographing lens.

Moreover, in the above-described conventional lens retaining structure, the shutter unit 1 a retaining the front lens group 1 incorporates therein a focusing mechanism for the front lens group 1a, a shutter mechanism and other components. This increases the size of the shutter unit 1 a and the movable lens mount 3 incorporating the unit 1a, hence increasing the entire size of the camera. Furthermore, since the shutter unit 1 a must be fixed to the movable lens mount 3 by, for example, screwing, assembling the shutter unit 1a into the movable lens mount 3 becomes a troublesome task.

A so-called rear-focusing type autofocusing device is also known, in which the focusing lens is constituted by the rear lens group 2 and hence the rear lens group 2 is moved to an in-focus position upon release of the shutter. In this type of autofocusing device, the front lens group is fixed to the movable lens mount and does not move for focusing.

Therefore, it is a third object of the present invention to provide a camera with a variable focus lens device having a lens retaining structure which can reduce the size of the movable lens mount and the overall size of the camera incorporating the mount, paying attention to the fact that it is not necessary to move the front lens group for focusing in a rear-focusing type of autofocusing device.

SUMMARY OF THE INVENTION

In order to achieve the above-described objects, the present invention provides a camera which is provided with a lens position detecting device for detecting the focal length of the photographing lens, wherein the lens position detecting device comprises a driving lens mount accommodated in a fixed lens mount fixed to a camera body, the driving lens mount being rotatable with respect to the fixed lens mount, the driving lens mount being capable of being advanced and retracted along the optical axis of the photographing lens as the driving lens mount rotates, a movable lens mount for retaining the photographing lens having a front lens group and a rear lens group, the movable lens mount having a rear lens group driving section for advancing or retracting the rear lens group along the optical axis while maintaining a predetermined optical relation between the front and rear lens groups, the movable lens mount being accommodated in the driving lens mount and being capable of being advanced and retracted along the optical axis in response to the rotation of the driving lens mount, a movable member capable of being linearly advanced and retracted along the optical axis while maintaining a predetermined relationship with the movable lens mount, and a displacement detection section for detecting the position of the movable member displaced from a predetermined reference position, and wherein the lens position detecting device detects the focal length of the photographic lens on the basis of the position of the movable member detected by the displacement detection section. The displacement detection means may be a position sensor, an encoder or any other means which detects distance information by variation in voltage or resistance values, etc.

The present invention further provides a camera which comprises a driving lens mount accommodated in a fixed lens mount fixed to a camera body, the driving lens mount being rotatable with respect to the fixed lens mount, the driving lens mount being capable of being advanced and retracted along the optical axis of the photographing lens as the driving lens mount rotates, a movable lens mount for retaining the photographing lens having a front lens group and a rear lens group, the movable lens mount having a rear lens group driving section for advancing or retracting the rear lens group along the optical axis while maintaining a predetermined optical relation between the front and rear lens groups, the movable lens mount being accommodated in the driving lens mount and being capable of being advanced and retracted along the optical axis in response to the rotation of the driving lens mount, a movable member capable of being linearly advanced and retracted along the optical axis while maintaining a predetermined relation with the movable lens mount, and a flare preventing mask disposed at a selected position on the movable member.

The present invention further provides a camera which is provided with a lens position detecting device for detecting the focal length of the photographing lens, wherein the lens position detecting device comprises a driving lens mount accommodated in a fixed lens mount fixed to the camera body, the driving lens mount being rotatable with respect to the fixed lens mount, the driving lens mount being capable of being advanced and retracted along the optical axis of the photographing lens as the driving lens mount rotates, a movable lens mount for retaining the photographing lens having a front lens group and a rear lens group, the movable lens mount having a rear lens group driving section for advancing or retracting the rear lens group along the optical axis while maintaining a predetermined optical relation between the front and rear lens groups, the movable lens mount being accommodated in the driving lens mount and capable of being advanced and retracted along the optical axis in response to the rotation of the driving lens mount, a movable member capable of being linearly advanced and retracted along the optical axis while maintaining a predetermined relation with the movable lens mount, a flare preventing mask disposed at a desired position on the movable member, and a displacement detection section for detecting the displacement of the movable member from a predetermined reference position, and wherein the lens position detecting device detects the focal length of the photographic lens on the basis of the position of the movable member as detected by the displacement detection section.

The present invention further provides a camera which is provided with a lens position detecting device for detecting the focal length of the photographing lens, wherein the lens position detecting device comprises a driving lens mount accommodated in a fixed lens mount fixed to the camera body, the driving lens mount being rotatable with respect to the fixed lens mount, the driving lens mount being capable of being advanced and retracted along the optical axis of the photographing lens as the driving lens mount rotates, a movable lens mount for retracting the photographing lens having a front lens group and a rear lens group, the movable lens mount having a rear lens group driving section for advancing or retracting the rear lens group along the optical axis while maintaining a predetermined optical relation between the front and rear lens groups, the movable lens mount being accommodated in the driving lens mount and being capable of being advanced and retracted along the optical axis in response to the rotation of the driving lens mount, a movable member capable of being linearly advanced and retracted along the optical axis while maintaining a predetermined relation with the movable lens mount, an urging section for normally pressing part of the movable member against a selected portion of the driving lens mount, and a displacement detection section for detecting the displacement of the movable member from a predetermined reference position, and wherein the lens position detecting device detects the focal length of the photographic lens on the basis of the position of the selected portion of the movable lens mount as detected by the displacement detection system.

The movable member comprises a slide that is slidable on a guide rod extending parallel to the optical axis of the photographing lens, or alternatively the movable member comprises a key member for preventing rotation of the movable lens mount about the optical axis.

The amount of advance or retraction of the movable member is less than that of the movable lens mount, and the amount of advance or retraction of the movable member is substantially one half of that of the movable lens mount.

The present invention further provides a camera which is provided with a lens position detecting device for detecting the focal length of the photographing lens, wherein the lens position detecting device comprises a driving lens mount accommodated in a fixed lens mount fixed to a camera body, the driving lens mount being rotatable with respect to the fixed lens mount, the driving lens mount being capable of being advanced and retracted along the optical axis of the photographing lens as the driving lens mount rotates, a movable lens mount for retaining the photographing lens having a front lens group and a rear lens group, the movable lens mount having a rear lens group driving section for advancing or retracting the rear lens group along the optical axis while maintaining a predetermined optical relation between the front and rear lens groups, the movable lens mount being accommodated in the driving lens mount and being capable of being advanced and retracted along the optical axis in response to the rotation of the driving lens mount, a key member capable of being linearly advanced and retracted along the optical axis in synchronism with the driving lens mount, the key member extending to a selected position on the movable lens mount in order to prevent rotation of the movable lens mount about the optical axis, a slider capable of being linearly advanced and retracted along the optical axis in synchronism with the driving lens mount, the slider having a portion normally pressed against a selected portion of the driving lens mount under the force of urging means, and a displacement detection section for detecting the amount of displacement of the slider form a selected position, and wherein the lens position detecting device detects the focal length of the photographic lens on the basis of the position of the slider as detected by the displacement detection section.

The present invention further provides a camera which is provided with a lens position detecting device for detecting the focal length of the photographing lens, wherein the lens position detecting device comprises a driving lens mount accommodated in a fixed lens mount fixed to the camera body, the driving lens mount being rotatable with respect to the fixed lens mount, the driving lens mount being capable of being advanced and retracted along the optical axis of the photographing lens as the driving lens mount rotates, a movable lens mount for retaining the photographing lens having a front lens group and a rear lens group, the movable lens mount having a rear lens group driving section for advancing or retracting the rear lens group along the optical axis while maintaining a predetermined optical relation between the front and rear lens groups, the movable lens mount being accommodated in the driving lens mount and being capable of being advanced and retracted along the optical axis in response to the rotation of the driving lens mount, a key member capable of being linearly advanced and retracted along the optical axis in synchronism with the driving lens mount, the key member extending to a selected position on the movable lens mount, a flare preventing mask mounted on a rear end of the key member, a slider capable of being linearly advanced and retracted along the optical axis in synchronism with the driving lens mount, the slider having a portion normally pressed against a selected portion of the driving lens mount under the force of urging means, and a displacement detection section for detecting the position of the slider displaced from a selected position, and wherein the lens position detecting device detects the focal length of the photographic lens on the basis of the position of the slider as detected by the displacement detection section.

The urging means comprises a pressing spring provided between the key member for preventing rotation of the movable lens mount about the optical axis, and the movable member.

The flare preventing mask is provided on the rear end portion of the key member, an outer peripheral edge portion of the flare preventing mask extending close to an inner surface of the driving lens mount.

Furthermore, in order to achieve the third object, the present invention provides a camera comprising a movable lens mount holding a photographing lens which includes a front lens group and a rear lens group, a lens mount driving section for advancing or retracting the movable lens mount along the optical axis of the photographing lens, and a rear lens group driving section for advancing or retracting the rear lens group along the optical axis while maintaining a predetermined optical relation between the front and rear lens groups, wherein the front lens group is retained by a lens holding frame which is formed integrally with the movable lens mount.

DETAILED DESCRIPTION OF THE PREFERRED EMBODIMENT

Figure 1:
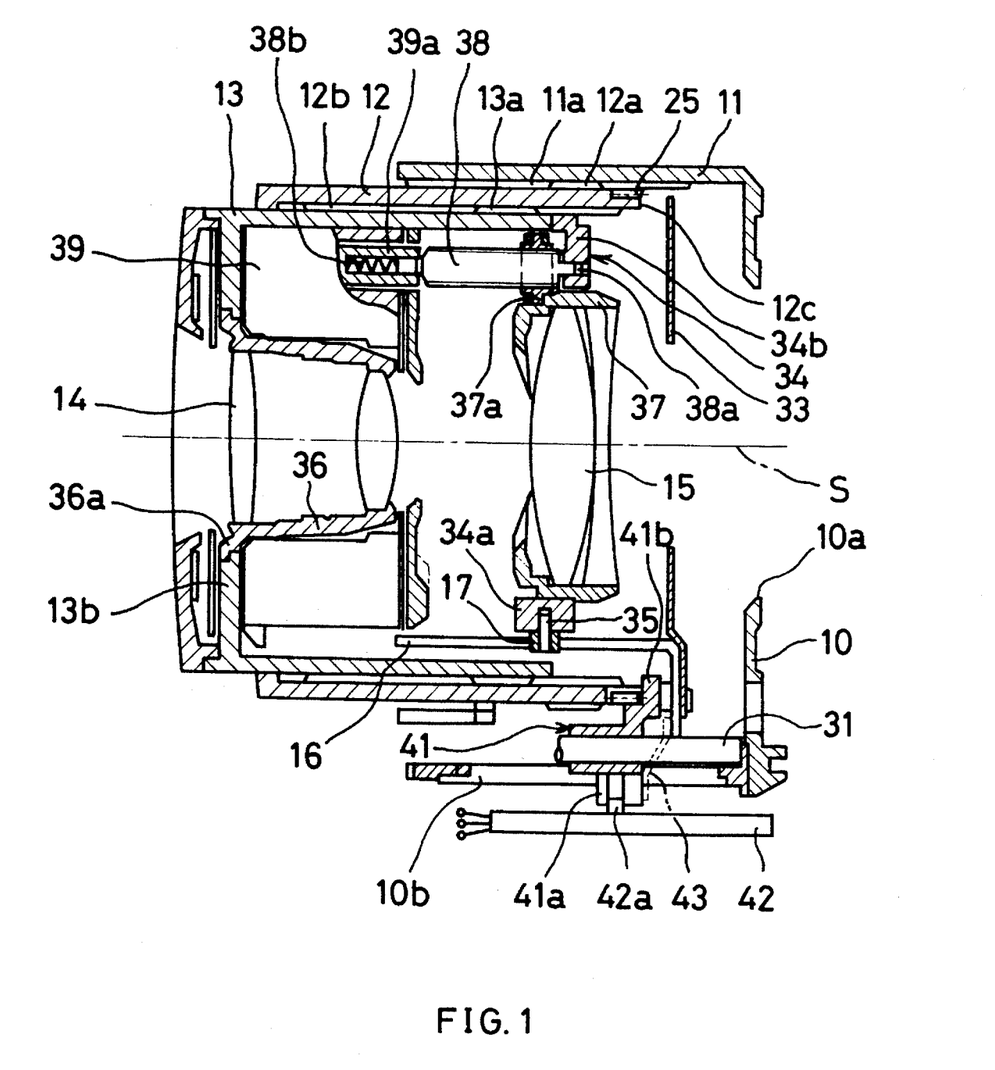
FIG. 1 is a schematic cross-sectional view of a camera with a variable lens device according to the present invention, taken along a vertical plane containing the optical axis, and having a lens position detecting device, in which the photographing lens is in the short focus or wide angle position.
Figure 2:
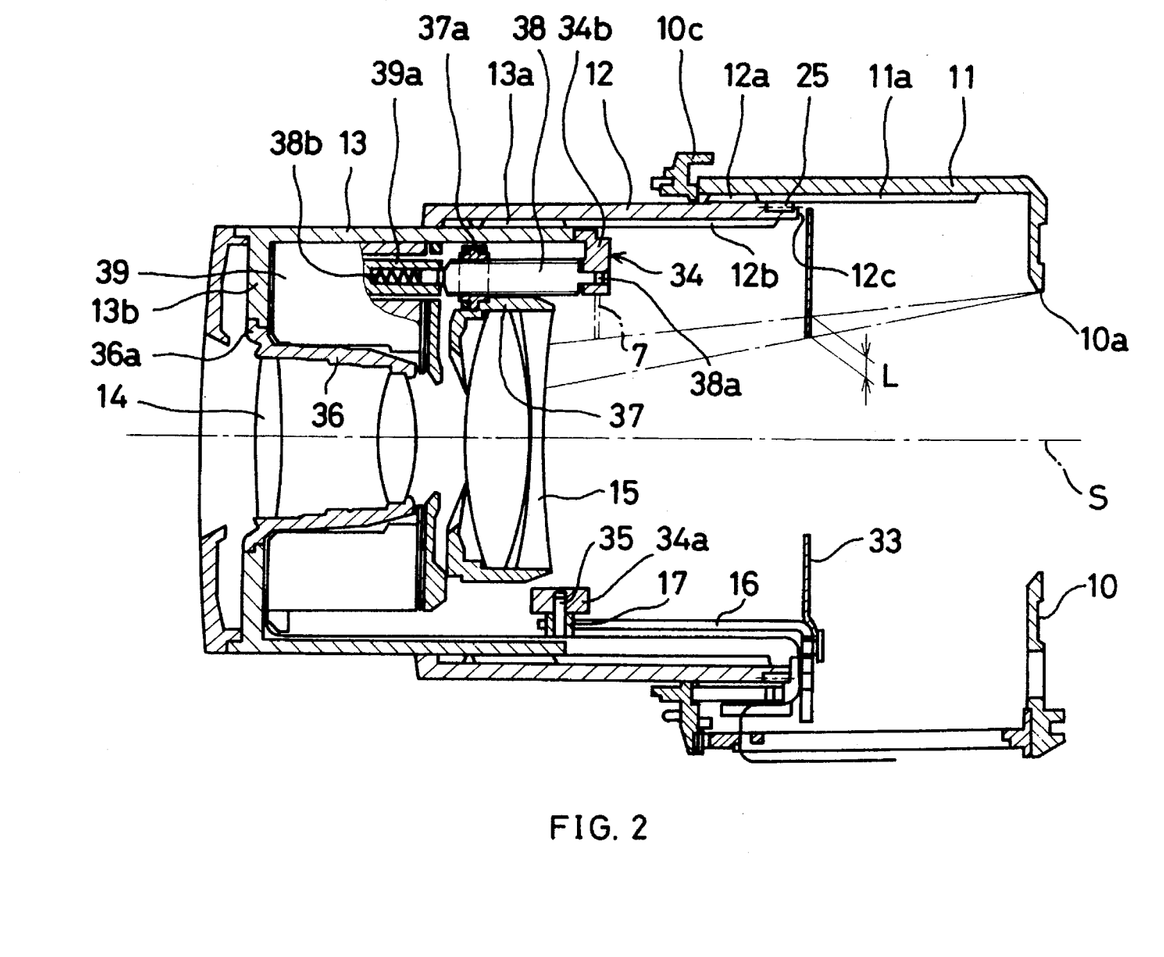
FIG. 2 is a view similar to FIG. 1 but in which the photographing lens is in the long focus or telephoto position.

FIG. 1 is a cross-sectional view of a zoom lens device for a camera which is in its short focus or wide-angle position, taken along a vertical plane containing the optical axis S. A lens position detecting device is also shown in FIG. 1. FIG. 2 is a cross-sectional view of the zoom lens device which is in its long focus or telephoto position. The zoom lens device is mainly made up of a fixed lens mount 11 fixed to a camera body 10, an intermediate lens mount member 12 as a driving lens mount rotatably accommodated in the fixed lens mount 11, a movable lens mount 13 accommodated in the intermediate lens mount 12, and a key plate 16 for guiding the movement of the movable lens mount 13. A front lens group 14 is retained in the front portion of the movable lens mount 13, while a rear lens group 15 is supported in the rear portion of the movable lens mount 13 so as to be movable with respect to the movable lens mount 13 along the optical axis S. The movement of the rear lens group 15 with respect to the movable lens mount 13 is by a predetermined amount in order to vary the focal length of the zoom lens device while maintaining a predetermined optical relation with the front lens group 14. An opening formed about the optical axis S of the camera body 10 constitutes the aperture 10a of the camera.

A helicoid 11a is formed in the inner peripheral surface of the fixed lens mount 11, and an outer helicoid 12a is formed in the outer peripheral surface of the intermediate lens mount 12. When the intermediate lens mount 12 is accommodated in the fixed lens mount 11, the helicoid 11 a is in meshed engagement with the helicoid 12a. An inner helicoid 12b is formed in the inner peripheral surface of the intermediate lens mount 12, and a helicoid 13a is formed in the outer peripheral surface of the movable lens mount 13. When the movable lens mount 13 is accommodated in the intermediate lens mount 12, the inner helicoid 12b is in meshed engagement with the helicoid 13a. The key plate 16 extends into the intermediate lens mount 12 and the movable lens mount 13 from the rear end portion of the intermediate lens mount 12. Rollers 17 provided within the movable lens mount 13 are in engagement with opposite sides of the key plate 16. A bracket 34 having a guide portion 34a on a lower portion thereof is fixed to the rear end portion of the movable lens mount 13, and the rollers 17 are supported in such a manner as to be rotatable about downwardly directed shaft pins 35 secured in the guide portion 34a.

The front lens group 14 is held by a lens holder 36. The lens holder 36 is of barrel shape suitable for holding the front lens group 14 and has, at its front end, a flange portion 36a which extends radially outwardly. The movable lens mount 13 has, at its front end, a flange portion 13b which extends radially inwardly. When the lens holder 36 is inserted into the movable lens mount 13 from the front thereof, the flange portion 36a is brought into engagement with the flange portion 13b, whereby the optical axis of the rear lens group 15 is automatically brought into alignment with the optical axis of the front lens group 14.

The rear lens group 15 is held by a lens holder 37, which is in turn supported by the movable lens mount 13 in such a manner as to be slidable with respect to the movable lens mount 13 along the optical axis S. A driving nut portion 37a is provided on the lens holder 37. The driving nut portion 37a is in threaded engagement with a driving screw 38 rotatably supported within the movable lens mount 13 parallel to the optical axis S. One end portion of the driving screw 38 is coupled, through a coupling 39a, to a rear lens group driving motor 39 supported in the movable lens mount 13 so that the driving screw 38 can be rotated by the rotation of the rear lens group driving motor 39. The other end portion of the driving screw 38 is supported by a bearing plate portion 34b formed in part of the bracket 34.

The front end portion of the driving screw 38 has a substantially D-shaped cross-section, and a hole formed in the coupling 39a also has a D-shaped cross-section. The driving screw 38 is brought into engagement with the coupling 39a by inserting the driving screw 38 into the hole of the coupling 39a. Accordingly, in such a state wherein the front end portion of the driving screw 38 is in engagement with the coupling 39a, the driving screw 38 and the output portion of the rear lens group driving motor 39 engage each other in a predetermined relationship. Consequently, the desired amount of movement of the driving nut portion 37a by the rotation of the driving screw 38, i.e., the desired amount of movement of the rear lens group 15 with respect to the movable lens mount 13, can be obtained merely by placing the driving nut portion 37a into threaded engagement with the driving screw 38 at a predetermined position along the optical axis S.

As shown in FIGS. 1 and 2, an adjusting screw 38a is in threaded engagement with the bearing plate portion 34b at the rear side thereof in such a manner that the forward surface of the adjusting screw 38a abuts the rear end of the driving screw 38. The restoring force of a return spring 38b accommodated in the coupling 39a is applied to the front end of the driving screw 38, so as continuously to urge the driving screw 38 rearward. When the adjusting screw 38a is tightened and moves forward, the driving screw 38 moves forward against the restoring force of the return spring 38b. When the adjusting screw 38a is loosened and retracted, the restoring force of the return spring 38b is applied to the driving screw 38, thus moving the driving screw 38 rearward. In other words, the initial position of the rear lens group 15 with respect to the front lens group 14 can be adjusted by changing the position of the adjusting screw 38a.

Figure 3:
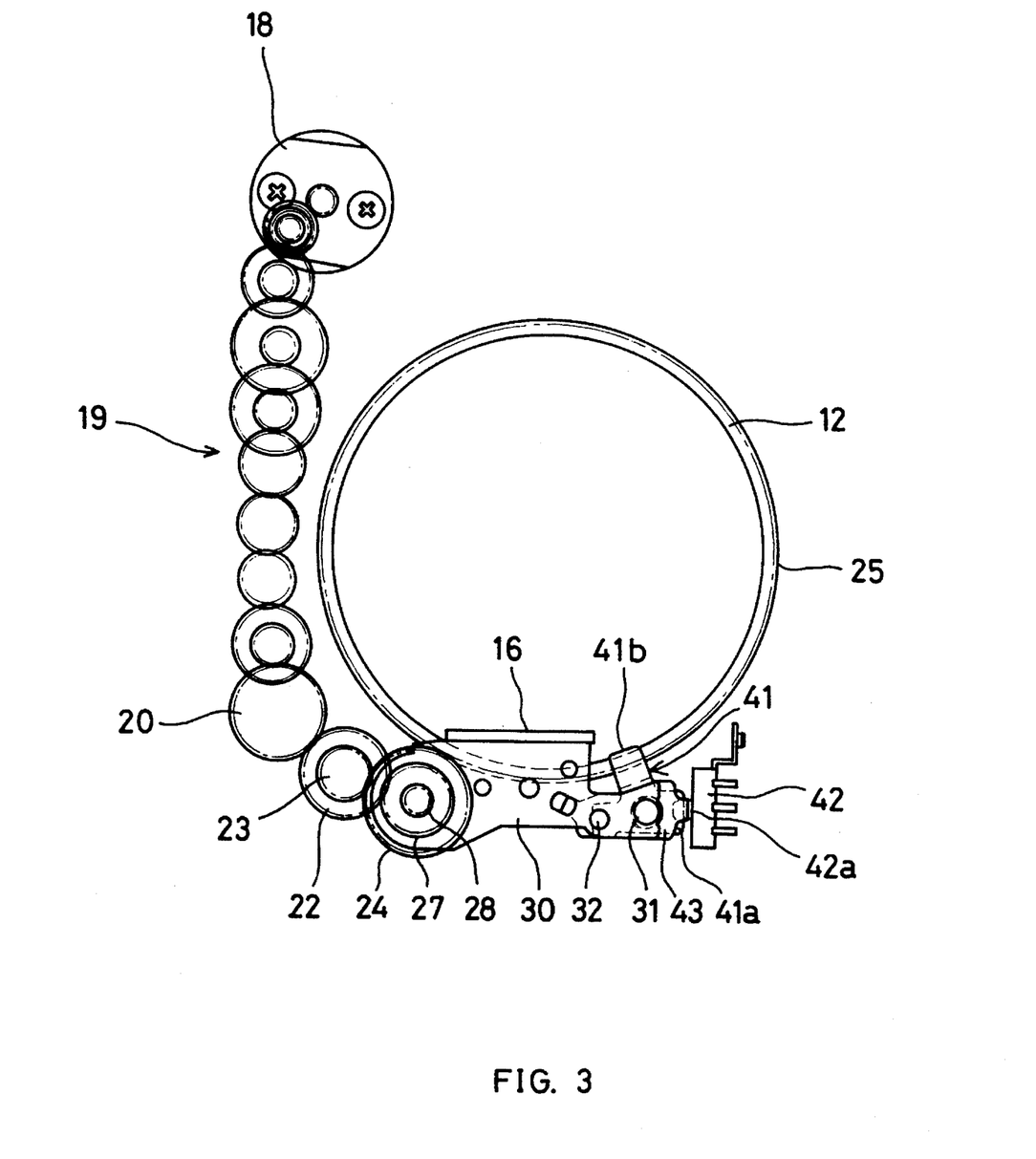
FIG. 3 is a rear view of essential parts of the camera body illustrating the power transmitting system for performing zooming operations.
Figure 4:
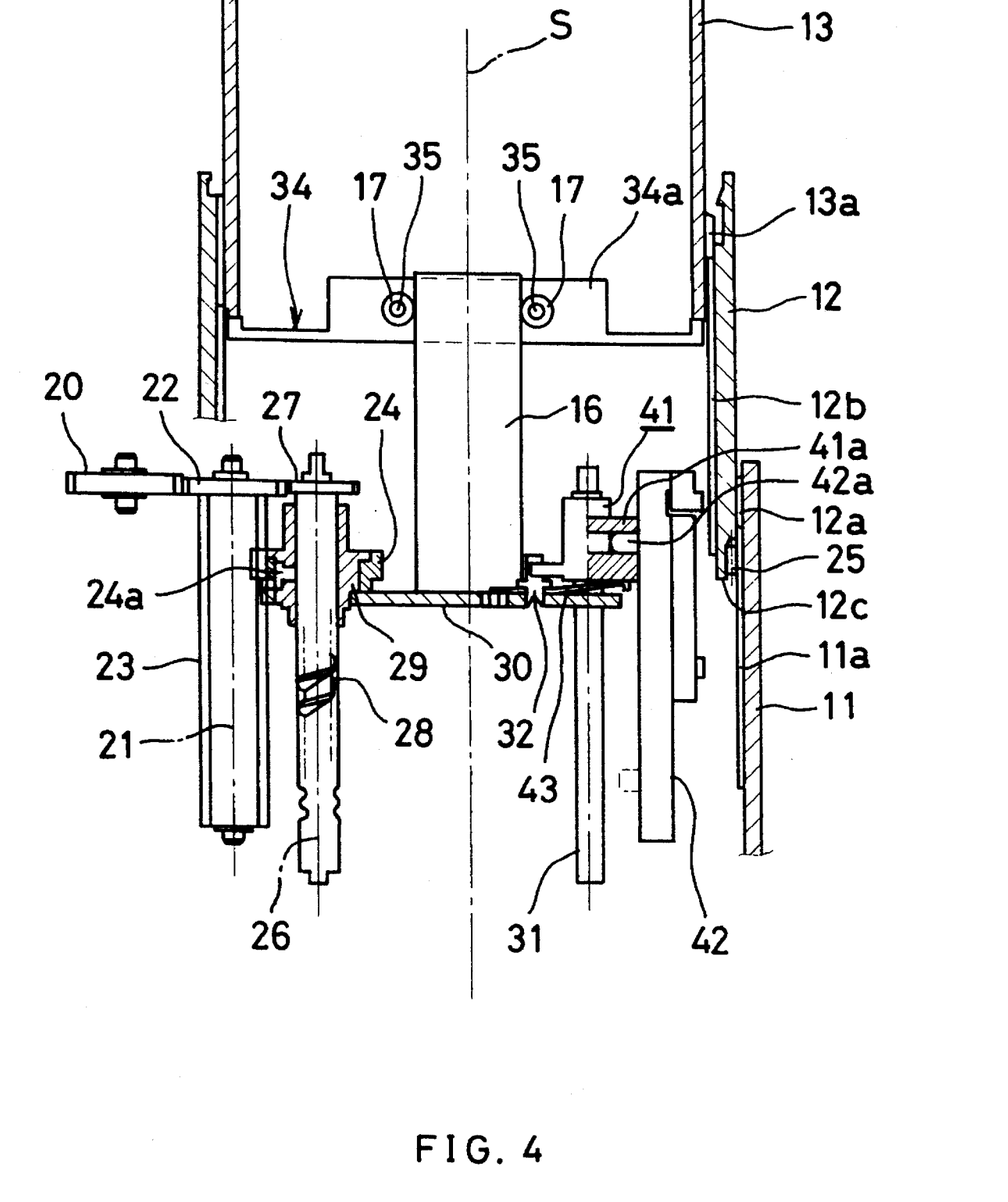
FIG. 4 is a schematic bottom view of the parts shown in FIG. 3.

The driving mechanism of the zoom lens device will now be described with reference to FIGS. 3 and 4. FIG. 3 is a rear view of the intermediate lens mount 12. FIG. 4 is a bottom view of FIG. 3. As shown in FIG. 3, power from a motor 18 incorporated in the camera body 10 is transmitted to a driving gear 20, via a gear train 19 for effecting any speed variation necessary. The driving gear 20 is in meshed engagement with an input gear 22 which rotates about an axis 21 (see FIG. 4) extending parallel to the optical axis S. A guide gear 23 is provided coaxially with the input gear 22. The guide gear 23 rotates in synchronism with the rotation of the input gear 22. As shown in FIG. 4, the guide gear 23 has a toothed section substantially longer than the path of travel of the rear end portion of the intermediate lens mount 12. The guide gear 23 is in meshed engagement with a lens mount driving gear 24 which rotates about an axis 26 parallel to the optical axis S. The lens mount driving gear 24 is in meshed engagement with a lens mount gear 25 formed on the outer periphery of the rear end portion of the intermediate lens mount 12. Thus, power from the motor 18 is transmitted to the lens mount gear 25 via the gear train 19, the driving gear 20, the input gear 22, the guide gear 23 and the lens mount driving gear 24.

The input gear 22 is in meshed engagement with an actuating gear 27 which rotates about axis 26. A driving screw 28 having an appropriate length is provided coaxially with the actuating gear 27. The actuating gear 27 and the driving screw 28 are rotatable about the axis 26 together as a unit. The driving screw 28 is in threaded engagement with a driving nut 29 on which the lens mount driving gear 24 is rotatably mounted through a bearing 24a. One end portion of a key bracket 30 is fitted into the driving unit 29. The key plate 16 is mounted on the upper end portion of the key bracket 30 in such a manner that the key plate 16 and the key bracket 30 move as a unit. A guide rod 3, which extends parallel to the optical axis S, is provided on the side of the key bracket 30 remote from the axis 26. The other end portion of the key bracket 30 is loosely and slidably fitted onto the guide rod 31 in order to prevent the key bracket 30 from pivoting about the axis 26.

A slider 41 serving as a movable member, is loosely fitted onto the guide rod 31 in such a manner as to be slidable parallel to the optical axis S on the guide rod 31. One end portion of the slider 41 is coupled to the key bracket 30 through a locking pin 32. Thus, the slider 41 slides along the guide rod 31 together with the key bracket 30 and rotation of the slider 41 about the guide rod 31 is prevented. A position sensor 42 serving as a displacement detection means is disposed on the side of the guide rod 31. An input terminal 42a of the position sensor 42 is gripped by a fork portion 41a formed on the slider 41. As shown in FIG. 1, the position sensor 42 is fixed to the camera body 10 outside the fixed lens mount 11. The fork portion 41a passes through an elongated hole 10b parallel to the optical axis S and is formed in the fixed lens mount 11 and is coupled to the input terminal 42a. A plate spring 43 is provided between the slider 41 and the key bracket 30. Accordingly, the slider 41 is urged in the forward direction by the plate spring 43, and consequently, an abutment tongue piece 41b formed on the slider 41 abuts against the end surface 12c of the intermediate lens mount 12, as shown in FIGS. 1 and 3.

As is further shown in FIGS. 1 and 2, a flare preventing mask 33 is mounted on the rear end portion of the key plate 16. In this embodiment, although the flare preventing mask 33 is mounted on the rear end portion of the key plate 16, it might instead be mounted on a portion of the key plate 16 other than the rear end portion. When the flare preventing mask 33 is mounted on the rear end portion of the key plate 16, as in the case of this embodiment, the outer peripheral edge of the flare preventing mask 33 can be located near the inner peripheral surface of the fixed lens mount 11, as shown in FIGS. 1 and 2. Consequently, the light reflected by the inner surface of the driving lens mount 12 is intercepted and prevented from reaching the aperture 10a, thus avoiding flare caused by that reflected light.

To assembly the zoom lens device, first the front lens group 14 and the rear lens group 15 are assembled in the movable lens mount 13 as follows. Since the front lens group 14 has been previously positioned in the lens holder 36, the front lens group 14 is assembled in the movable lens mount 13 by inserting the lens holder 36 with the front lens group 14 held therein into the movable lens mount 13 from the front side thereof and by bringing the flange portion 36a of the lens holder 36 into engagement with and securing the flange portion 36a to the flange portion 13b of the movable lens mount 13 using an adhesive or other suitable means. That is, assembling the lens holder 36 into the movable lens mount 13 requires no screwing. Although the front lens group 14 is assembled in the movable lens mount 13 by adhering the lens mount 36 to the movable lens mount 13 in this embodiment, the lens holder 36 and the movable lens mount 13 may be integrally formed as a unit.

The rear lens group 15 is assembled as follows. The driving screw 38 is brought into threaded engagement with the driving nut portion 37a of the lens holder 37, and the forward end of the driving screw 38 is brought into engagement with the coupling 39a of the rear lens group driving motor 39. If the forward end of the driving screw 38 and the coupling 39a are formed such that they have, say, complementary D-shaped cross sections and if the driving screw 38 is brought into fitting engagement with the coupling 39a by inserting the forward end of the driving screw 38 into a hole formed in the coupling 39a, the driving screw 38 can engage with the coupling 39a in a predetermined relation with the output portion of the rear lens group driving motor 39, and thus the positional relationship between the rear lens group 15 and the rear lens group driving motor 39 can be readily fixed. Thereafter, the bracket 34 is fixed to the movable lens mount 13 by fitting the bearing plate portion 34b onto the rear end of the driving screw 38.

Next, the movable lens mount 13 having the front and rear lens groups 14 and 15 incorporated therein is inserted into the intermediate lens mount 13 from the rear side thereof, and the inner helicoid 12b of the intermediate lens mount 13 is placed into meshed engagement with the helicoid 13a of the movable lens mount 13. Thereafter, that intermediate lens mount 12 is inserted into the fixed lens mount 11 from the front side thereof, and the outer helicoid 12a of the intermediate lens mount 12 is placed into meshed engagement with the helicoid 11a of the fixed lens mount 11. Finally, a front cover 10c is mounted on the fixed lens mount 11 from the front side thereof as shown in FIG. 2, whereby assembly of the zoom lens device is completed.

The initial focal point of the photographing lens can be adjusted by moving the adjusting screw 38a after having set the zoom lens device at the shortest focal length position. That is, the driving screw 38 is advanced against the restoring force of the return spring 38b as the adjusting screw 38a is tightened, and it is retracted due to the restoring force of the return spring 38b as the adjusting screw 38a is loosened. Since the driving screw 38 is in threaded engagement with the driving nut portion 37a of the lens holder 37 and the lens holder 37 holds the rear lens group 15, advancing and retracting the driving screw 38 advances and retracts the rear lens group 15. Thus, the rear lens group 15 may be located in a position wherein the photographing lens is focused on, for example, a test chart by advancing or retracting the adjusting screw 38a and hence the driving screw 38. After the adjustment of the initial focal point has been completed, the adjusting screw 38a is permanently secured to the bearing plate portion 34b using an adhesive or the like.

FIG. 1 illustrates the zoom lens device in a wide-angle position. Zooming of the photographing lenses 14 and 15 is powered by the motor 18. FIGS. 2 and 4 show the zoom lens device in a telephoto position. Once the motor 18 is driven, the rotation of the motor 18 is transmitted to the driving gear 24 through the gear train 19. Since the driving gear 20 is in mesh with the input gear 22 which is in turn in mesh with the operation gear 27, the rotation of the driving gear 20 rotates the input gear 22 and the operation gear 27.

Furthermore, because the guide gear 23 is provided on the rotation axis 21 of the input gear 22, the rotation of the input gear 22 rotates the guide gear 23. In addition, because the guide gear 23 is in mesh with the lens mount driving gear 24 which is in turn in mesh with the lens mount gear 25, the rotation of the guide gear 23 is transmitted to the lens mount gear 25 through the lens mount driving gear 24. Since the lens mount gear 25 is formed on the outer peripheral surface of the intermediate lens mount 12, the rotation of the lens mount gear 25 rotates the intermediate lens mount 12. The intermediate lens mount 12 is coupling, through the outer helicoid 12a and the helicoid 11a, to the fixed lens mount 11, which is fixed to the camera body 10. Thus, when rotated, the intermediate lens mount 2 moves along the optical axis S with respect to the fixed lens mount 11. When the zoom lens device is in a wide-angle position, the intermediate lens mount 12 is advanced. The intermediate lens mount 12 is retracted when the zoom lens device is in a telephoto position.

When the operation gear 27 rotates, the driving screw 28 provided coaxially with the operation gear 27 rotates, thus moving the driving nut 29 which is in mesh with the driving screw 28 along the driving screw 28. The direction of movement of the driving nut 29 is the same as the direction in which the intermediate lens mount 12 moves, i.e., the driving nut 29 is advanced when the zoom lens device is in a wide-angle position, and is retracted when the zoom lens device is at a telephoto position. The pitches of the threads of the driving screw 28 and the driving nut 19 as well as the pitches of the helicoid 11a and the outer helicoid 12a are chosen to ensure that the rate of movement of the driving nut 29 and the rate of movement of the intermediate lens mount 12 are substantially the same.

When the intermediate lens mount 12 rotates, the inner helicoid 12b and the helicoid 13a coact with the intermediate lens mount 12 to cause the movable lens mount 13, which is inhibited from rotating by the key plate 16 engaged with the rollers 17, to be moved in the direction of the optical axis S. The direction of movement of the movable lens 13 is the same as the direction of movement of the intermediate lens mount 12. Thus, the movable lens mount 13 moves forward when the zoom lens device is in a wide-angle position and rearward when the zoom lens device is in a telephoto position. The amount of movement of the movable lens mount 13 is larger than the amount of movement of the intermediate lens mount 12. In this embodiment, the amount of movement of the movable lens mount 13 is twice that of the amount of movement of the intermediate lens mount 12.

Since the key plate 16 is formed integrally with the key bracket 30 fitted onto the driving nut 29, when the driving nut 29 moves along the driving screw 28, the key plate 16 also moves in the same direction as the driving nut 29. The key plate 16 has such a length as to ensure that the rollers 17 will not leave it even when the movable lens mount 13 has moved to the forwardmost position with respect to the intermediate lens mount 12. Furthermore, because the movement of the key plate 16 needs only be sufficient to prevent rotation of the movable lens mount 13, it is not necessary for the key plate 16 to be driven at the same speed as the movable lens mount 13, i.e., the key plate 16 can be driven with a shorter stroke than that of the movable lens mount 13, . so long as the plate 16 has an appropriate length.

Since the lens mount driving gear 24 for driving the intermediate lens mount 12 is in meshed engagement with the guide gear 23 extending in the direction of the optical axis S, even when the lens mount driving gear 24 moves along the driving screw 28 together with the driving nut 29, the meshed engagement between the lens mount driving gear 24 and the guide gear 23 can be maintained. Furthermore, since the speed of movement of the driving nut 29 is substantially equal to the speed at which the intermediate lens mount 12 is moved, the meshed engagement between the lens mount driving gear 24 and the lens mount gear 25 can be maintained.

The movement of the rear lens group 15 with respect to the movable lens mount 13 along the optical axis S is powered by the rear lens group driving motor 39. When the rear lens group driving motor 39 rotates, the driving screw 38 coupled to the rear lens group driving motor 39 through the coupling 39a also rotates. Since the driving nut portion 37a is in threaded engagement with the driving screw 38 and the driving nut portion 37a is formed by part of the lens holder 37, rotation of the driving nut portion 37a with respect to the driving screw 38 is prevented. So, when the driving screw 38 rotates, the driving nut portion 37a is advanced or retracted along the driving screw 38, thus advancing or retracting the rear lens group 15 along the optical axis S so that the distance between the front and rear lens groups 14 and 15 is changed. By driving the rear lens group 15 in accordance with the movement of the movable lens mount 13, the focal distance is changed while a predetermined optical relation is maintained between the photographing lens groups 14 and 15.

When the zoom lens device has moved to the telephoto position, the condition illustrated in FIGS. 2 and 4 occurs, i.e, the movable lens mount 13 is in the forwardmost position in the intermediate lens mount 12 while the intermediate lens mount 12 is in the forwardmost position in the fixed lens mount 11. Furthermore, the key plate 16 extends from the rear end portion of the intermediate lens mount 12 in the forward direction, and the distal end portion of the key plate 16 is in engagement with the rollers 17 provided within the movable lens mount 13. That is, the key plate 16 is at the rear of the movable lens mount 13, and the key bracket 30 on which the key plate is mounted is also at the rear of the movable lens mount 13. The amount of movement of that key bracket 30 is substantially equal to the amount of movement of the intermediate lens mount 12, which is about one half of the amount of movement of the movable lens mount 13.

Since the slider 41 loosely and slidably fitted on the guide rod 31 coupled to the key bracket 30 is coupled to the key bracket 30, when the key bracket 30 is advanced or retracted, the slider 41 also is advanced or retracted. Furthermore, since the abutment tongue piece 41b is normally pressed against the end surface 12c of the intermediate lens mount 12 via the plate spring 43, in whichever direction the intermediate lens mount 12 moves, the tongue piece 41b is kept in abutment with the end surface 12c. Since the slider 41 is coupled to the input terminal 41a of the position sensor 42, when the slider 41 is advanced or retracted, the position of the input terminal 41a with respect to the position sensor 42 changes, changing the output signal of the position sensor 42. The position of the intermediate lens mount 12 is detected on the basis of the magnitude of the output signal from the sensor 42. Since the intermediate lens mount 12 and the movable lens mount 13 move forward or rearward with a predetermined relation maintained therebetween, the position of the movable lens mount 13 is detected from the position of the intermediate lens mount 12, thereby detecting the zooming position. A CPU (not shown) mounted on the camera controls the exposure and autofocusing operations on the basis of the detected zooming position.

This embodiment employs, as the movable member, the slider 41 which moves together with the key bracket 30. However, any other member which moves along the optical axis S while keeping a predetermined relation with the photographing lenses 14 and 15, i.e., the movable lens mount 13, may also be used as the movable member. For example, the movable lens mount 13 may be coupled directly to the input terminal 42a of the position sensor 42.

To change the photographing position of the zoom lens device from the telephoto position to the wide-angle position, the intermediate lens mount 12 is rotated in a direction opposite to that when it is moved to the telephoto position, by, for example, reversely rotating the motor 18. When the intermediate lens mount 12 is rotated, the movable lens mount 13 is retracted, retracting the intermediate lens mount 12 and moving the zoom lens device to the wide-angle position shown in FIG. 1. In addition, the rear lens group driving motor 39 is also rotated in a direction opposite to that when it operates to change the photographing position to the telephoto position, so as to move the rear lens group 15 along the optical axis S.

When the key plate 16 is in a wide-angle position, the flare preventing mask 33 is located near the aperture 10a as shown in FIG. 1. Since a plane which connects the edge of the aperture 10a to the distal edge of the flare preventing mask 33 intersects the photographing lenses 14 and 15 near the optical axis S, light having passed through the peripheral portion of the photographing lenses 14 and 15 is intercepted by the flare preventing mask 33, thus effectively preventing the occurrence of flare.

When the zoom lens device has moved to the telephoto position, the key plate 16 is located closer to the aperture 10a than the rear end of the movable lens mount 13 as shown in FIG. 2, and the flare preventing mask 33 mounted on that key plate 16 is located closer to the aperture 10a than the rear end of the movable lens mount 13. In FIG. 2, a conventional flare preventing mask 7 mounted on the movable lens mount is indicated by phantom lines. There is a difference, as indicated by a symbol L in FIG. 2, between the plane connecting the edge of the aperture 10a to the flare preventing mask 7 and the plane connecting the edge of the aperture 10a to the flare preventing mask 33. Accordingly, the flare preventing mask 33 allows only the light which has passed through the narrow central portions of the photographing lenses 14 and 15 to reach the aperture 10a, thus preventing flare from being caused by light having passed through the peripheral edge portion of the photographing lenses 14 and 15.

According to the camera with a variable focus lens device of the present invention as has thus far been described, since the movement or displacement of the movable member which is advanced or retracted along the optical axis while keeping a predetermined relation with the movable lens mount is detected via suitable displacement detection means, the position of the photographing lens can be detected directly from the linear displacement amount of the movable member in the same direction as the movement of the photographing lens. Consequently, the position of the photographing lens can be readily calculated from the detected position of the movable member. In addition, the influence of errors caused during assembling of the components can be minimized.

Furthermore, because the position of the movable member which moves over a shorter distance than the movable lens mount is detected, the lens position detecting device can be made small in size.

Furthermore, since the lens holder for holding the front lens group is formed integrally with the movable lens mount, the assembly of the front lens group into the movable lens mount is simplified, and thus efficiency in assembling the camera can be greatly improved. Furthermore, since assembly of the lens holder into the movable lens mount requires no screwing, no space for screwing is necessary, thus reducing the size of the movable lens mount and hence the overall size of the camera.

Furthermore, because the leans holder with the front lens group assembled therein is assembled into the movable lens mount, assembling errors of the front lens group can be avoided, thus making the photographing lens highly accurate.

Furthermore, because the flare preventing mask is mounted on the key member that guides the advance and retraction of the movable lens mount and is also capable of being advanced and retracted in synchronism with the movable lens mount over a distance shorter than the path of movement of the movable lens mount, the flare preventing mask is located at a position closer to the aperture than the rear end of the movable lens mount even when the photographing lens is in a long focus position. Consequently, light having passed through the periphery of the photographing lens can be intercepted more effectively than in the case in which the flare preventing mask is provided on the rear end portion of the movable lens mount, and the occurrence of flare can thus be sufficiently prevented.

When the photographing lens is in a short focus position, the flare preventing mask is located close to the aperture and can effectively prevent the occurrence of flare even in this position.

Furthermore, since the flare preventing mask is mounted on the key member, the camera can effectively prevent the occurrence of flare without an increase in the cost of production and can take pictures having sharp images with a greatly simplified structure.

Furthermore, since the flare preventing mask is mounted on the rear end portion of the key member, the outer edge of the flare preventing mask can be located close to the inner surface of the driving lens mount or the fixed lens mount. Because of this, the flare preventing mask extends sufficiently close to the inner surface of the driving lens mount or the fixed lens mount, and the occurrence of flare due to light reflected by the inner surface of the driving lens mount or fixed lens mount can be more effectively prevented, as compared to a conventional flare preventing mask which is mounted on the rear end portion of the movable lens mount and cannot prevent the occurrence of flare due to the light reflected by the inner surface of the driving lens mount or the fixed lens mount.

What is claimed is:

1. A camera with a variable focus lens device having an autofocusing function, the camera including a lens position detecting device for detecting a focal length of a photographing lens having a front lens group and a rear lens group, said lens position detecting device comprising:

a driving lens mount in a fixed lens mount fixed to a camera body, said driving lens mount being rotatable with respect to said fixed lens mount, said driving lens mount being advanced and retracted along an optical axis of said photographing lens as said driving lens mount rotates;

a movable lens mount carrying said photographing lens, said movable lens mount having rear lens group driving means for advancing or retracting said rear lens group relative to said front lens group along said optical axis while maintaining a predetermined optical relation between said front and rear lens groups, said movable lens mount being disposed in said driving lens mount and being advanced and retracted along said optical axis in response to the rotation of said driving lens mount;

a movable member that is rectilinearly advanced and retracted along said optical axis while maintaining a predetermined relation with said movable lens mount;

displacement detection means for detecting the displacement of said movable member from a predetermined reference position; and a lens position detecting device detecting the focal length of said photographic lens on the basis of the position of said movable member as detected by said displacement detection means.

2. A camera with a variable focus lens device comprising a photographing lens having a front lens group and a rear lens group, said camera comprising:

a driving lens mount in a fixed lens mount fixed to a camera body, said driving lens mount being rotatable with respect to said fixed lens mount, said driving lens mount being advanced and retracted along an optical axis of said photographing lens as said driving lens mount rotates;

a movable lens mount carrying said photographing lens, said movable lens mount having rear lens group driving means for advancing or retracting said rear lens group relative to said front lens group along said optical axis while maintaining a predetermined optical relation between said front and rear lens groups, said movable lens mount being disposed in said driving lens mount and being advanced and retracted along said optical axis in response to the rotation of said driving lens mount;

a movable member that is rectilinearly advanced and retracted along said optical axis while maintaining a predetermined relation with said movable lens mount; and a flare preventing mask carried by said movable member.

3. A camera according to claim 1, further comprising a flare preventing mask carried by the movable member.

4. A camera according to claim 1, further comprising urging means for normally pressing part of said movable member against a selected portion of said driving lens mount; said movable member comprising said movable lens mount.

5. A camera according to claim 1, wherein said movable member comprises a slider sliding along a guide rod extending parallel to said optical axis of said photographing lens.

6. A camera according to claim 2, wherein said movable member comprises a slider sliding along a guide rod extending parallel to said optical axis of said photographing lens.

7. A camera according to claim 1, wherein said movable member comprises a key member for preventing rotation of said movable lens mount about said optical axis.

8. A camera according to claim 2, wherein said movable member comprises a key member for preventing rotation of said movable lens mount about said optical axis.

9. A camera according to claim 1, wherein said movable member is advanced and retracted a lesser distance than said movable lens mount.

10. A camera according to claim 2, wherein said movable member is advanced and retracted a lesser distance than said movable lens mount.

11. A camera according to claim 1, wherein said movable member is advanced and retracted a distance substantially one half of that of said movable lens mount.

12. A camera according to claim 2, wherein said movable member is advanced and retracted a distance substantially one half of that of said movable lens mount.

13. A camera according to claim 7, further comprising a flare preventing mask mounted on a rear end of said key member.

14. A camera according to claim 8, further comprising a flare preventing mask mounted on a rear end of said key member.

15. A camera according to claim 13, wherein an outer peripheral edge portion of said flare preventing mask extends close to an inner surface of said driving lens mount.

16. A camera according to claim 14, wherein an outer peripheral edge portion of said flare preventing mask extends close to an inner surface of said driving lens mount.

17. A camera according to claim 1, wherein said camera has a rear focusing type autofocusing function and said front lens group is retained by a lens holding frame which is formed integrally with said movable lens mount.

18. A camera according to claim 2, wherein said camera has a rear focusing type autofocusing function and said front lens group is retained by a lens holding frame which is formed integrally with said movable lens mount.

19. A camera with a variable focus lens device, having a rear focusing type autofocusing function, said camera comprising:

a movable lens mount holding a photographing lens which includes a front lens group and a rear lens group;

lens mount driving means for advancing or retracting said movable lens mount along an optical axis of said photographing lens; and rear lens group driving means for advancing or retracting said rear lens group relative to said front lens group along said optical axis while maintaining a predetermined optical relation between said front and rear lens groups, wherein said front lens group is retained by a lens holding frame which is formed integrally with said movable lens mount.

* * * * *